United States Patent
Saldungaray et al.

(10) Patent No.: US 8,593,140 B2
(45) Date of Patent: Nov. 26, 2013

(54) FORMATION TESTING AND EVALUATION USING LOCALIZED INJECTION

(75) Inventors: Pablo Saldungaray, Granada (MX); Edward Harrigan, Richmond, TX (US); Bernard Montaron, Paris (FR); Raghu Ramamoorthy, Pimpri Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 790 days.

(21) Appl. No.: 12/740,532

(22) PCT Filed: Oct. 30, 2008

(86) PCT No.: PCT/US2008/081756
§ 371 (c)(1),
(2), (4) Date: Jun. 29, 2010

(87) PCT Pub. No.: WO2009/058980
PCT Pub. Date: May 7, 2009

(65) Prior Publication Data
US 2010/0264915 A1   Oct. 21, 2010

Related U.S. Application Data

(60) Provisional application No. 60/985,085, filed on Nov. 2, 2007, provisional application No. 61/080,364, filed on Jul. 14, 2008.

(51) Int. Cl.
*G01V 3/14* (2006.01)
(52) U.S. Cl.
USPC .......................................... 324/303; 324/346

(58) Field of Classification Search
USPC .................................. 324/303, 324, 345–346; 73/152.39–152.42; 166/254.01–254.2
See application file for complete search history.

(56) References Cited

U.S. PATENT DOCUMENTS

| | | | |
|---|---|---|---|
| 6,229,308 B1 | 5/2001 | Freedman | |
| 6,366,087 B1 | 4/2002 | Coates et al. | |
| 6,564,883 B2 * | 5/2003 | Fredericks et al. | 175/50 |
| 6,642,715 B2 | 11/2003 | Speier et al. | |
| 6,856,132 B2 | 2/2005 | Appel et al. | |
| 7,032,661 B2 * | 4/2006 | Georgi et al. | 166/250.01 |

(Continued)

FOREIGN PATENT DOCUMENTS

| | | |
|---|---|---|
| WO | 2007008876 | 1/2007 |
| WO | 2007119471 | 1/2007 |

OTHER PUBLICATIONS

Valenti, Nick P. et al., A Unified Theory on Residual Oil Saturation and Irreducible Water Saturation, SPE 77545, Sep. 29-Oct. 2, 2002, San Antonio, Texas.

(Continued)

*Primary Examiner* — Melissa Koval
*Assistant Examiner* — Rishi Patel
(74) *Attorney, Agent, or Firm* — John Vereb

(57) ABSTRACT

Evaluating a formation by lowering a downhole tool in a wellbore penetrating the formation, injecting a fluid into the formation at an injection zone via the downhole tool, and using a formation evaluation sensor to perform a measurement at each of a plurality of locations in the wellbore each proximate the injection zone. At least two of the plurality of measurements are compared, and a formation property is determined based on the comparison.

21 Claims, 10 Drawing Sheets

(56) References Cited

U.S. PATENT DOCUMENTS

| | | |
|---|---|---|
| 7,380,599 B2 | 6/2008 | Fields et al. |
| 7,614,294 B2 | 11/2009 | Hegeman et al. |
| 8,191,416 B2 * | 6/2012 | Kuchuk et al. ............. 73/152.41 |
| 2004/0055745 A1 | 3/2004 | Georgi et al. |
| 2004/0119471 A1 | 6/2004 | Blanz et al. |
| 2007/0203651 A1 * | 8/2007 | Blanz et al. ....................... 702/6 |
| 2008/0066535 A1 | 3/2008 | Vasques et al. |
| 2011/0198078 A1 * | 8/2011 | Harrigan et al. ........... 166/254.2 |

OTHER PUBLICATIONS

Crowe, M.B. et al., Measuring Residual Oil Saturation in West Texas Using NMR, SPWLA 38th Annual Logging Symposium, Jun. 15-18, 1997.

* cited by examiner

FORMATION TESTING AND EVALUATION USING LOCALIZED INJECTION

CROSS-REFERENCE TO RELATED APPLICATIONS

This application claims the benefit of U.S. Provisional Application No. 60/985,085, entitled "METHOD AND APPARATUS FOR FORMATION TESTING AND EVALUATION," filed Nov. 2, 2007, the disclosure of which is hereby incorporated herein by reference.

This application also claims the benefit of U.S. Provisional Application No. 61/080,364, entitled "METHOD AND APPARATUS FOR FORMATION TESTING AND EVALUATION USING LOCALIZED INJECTION," filed Jul. 14, 2008, the disclosure of which is hereby incorporated herein by reference.

BACKGROUND OF THE DISCLOSURE

Whilst assessing hydrocarbon bearing formations and reservoirs, it is important to acquire knowledge of formation and formation fluid properties which influence the production or yield from the drilled formation. Indeed, as the hydrocarbon bearing formation is produced and formation fluid is extracted to a surface location, a portion of the hydrocarbon initially present in the formation pores remains in the formation, limiting thereby the amount of hydrocarbon that may be recovered from the formation, or the total production capacity. In particular, this portion of hydrocarbon may be quantified using an important formation property or parameter, the Residual Oil Saturation, sometimes referred to as ROS or SOR.

Various techniques are known to decrease the residual oil saturation in hydrocarbon bearing formations and reservoirs, and thereby increase the total production capacity. These techniques, sometimes referred to as Enhanced Oil Recovery (EOR) techniques, include but are not limited to the injection of fluid that may contain surfactants, solvents, stimulants, hydrocarbons, or other fluid(s) that changes the mobility, wetting phase, and/or saturation of the reservoir fluid. The ROS measured after various EOR schemes can also be used to evaluate the improvement of the oil recovery factor. The measured ROS may be useful to determine if a particular EOR scheme provides sufficient improvement in oil recovery that would overcome the cost of its associated EOR scheme.

Core analysis may be useful to determine the ROS in a hydrocarbon reservoir. This technique, sometimes referred to as Special Core AnaLysis (SCAL), involves capturing cores at selected locations in a well drilled in the formation, and bringing the cores to a surface laboratory. At the surface laboratory, a formation fluid is first reintroduced in the cores. Then, the formation fluid is flushed with a substitution fluid (e.g. reservoir water, reservoir gas, etc. . . . ) and the ROS is measured. The ROS measured for the plurality of cores may further be correlated to well logging properties measured at the capture locations of the cores. An ROS may thereby be extrapolated along the entire producing formation using the well logging properties. However, there may in some cases be drawbacks to ROS determination from core analysis. First, core analysis may only be representative of what is happening in the rock matrix at a relatively small scale (e.g. the size of the core), and may not be representative of the formation at a larger scale. Second, capturing the core(s) may be operationally complex and expensive, and may not be reliable in all formation types, for example in highly fractured formations. Thus, it may be advantageous in some cases to measure the ROS in situ.

Well injection techniques may also be useful to determine the ROS in a hydrocarbon reservoir. A known technique, sometimes referred to as Nuclear Magnetic Resonance (NMR) log-inject-log method, involves substituting the wellbore fluid with Manganese Chloride (MnCl2) doped water, measuring a first NMR log over the length of the well to estimate an initial or pristine oil saturation in the formation surrounding the wellbore, reaming a portion of the well for facilitating the injection of MnCl2 doped water into the formation surrounding the wellbore, and measuring a second NMR log over the length of the well to estimate the Residual Oil Saturation after the formation water has been displaced by the MnCl2 doped water. However, as is apparent to the persons skilled in the art, this method involves complex logistics and expensive rig time. Thus, it may be advantageous in some cases to provide a method for estimating the ROS that involves injecting fluid through a localized portion of the well.

SUMMARY OF THE DISCLOSURE

In accordance with the present disclosure, an example method for evaluating a formation involves lowering a downhole tool in a wellbore penetrating the formation, injecting a fluid in the formation via the downhole tool at an injection zone, and providing a formation evaluation sensor in the wellbore close to the injection zone. The formation evaluation sensor is moved to a plurality of locations in the wellbore, and a measurement is performed at the plurality of locations in the wellbore using the sensor. At least two of the plurality of measurements are compared, and a formation property is determined based on the comparison.

In accordance with the present disclosure, another example method for evaluating a formation involves lowering a downhole tool in a wellbore penetrating the formation, injecting a fluid in the formation via the downhole tool at an injection zone, and providing a formation evaluation sensor in the wellbore close to the injection zone, the formation evaluation sensor having a larger sensitivity in an angular sector. The angular sector in which the formation evaluation sensor has a larger sensitivity is oriented relative to the injection zone. Using the sensor in the oriented position, at least one measurement is performed, and a formation property is determined based on the measurement.

In accordance with the present disclosure, yet another example method for evaluating a formation involves lowering a downhole tool in a wellbore penetrating the formation, injecting a fluid in the formation via the downhole tool at an injection zone, and providing a formation evaluation sensor in the wellbore close to the injection zone. The formation evaluation sensor is moved to a plurality of locations in the wellbore, and a measurement is performed at the plurality of locations in the wellbore using the sensor. At least one injection spot where the injection has been successful is determined from the plurality of measurements; and a formation property representative of the injection spot is determined.

Other aspects and advantages of the present disclosure will be apparent from the following description and the appended claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
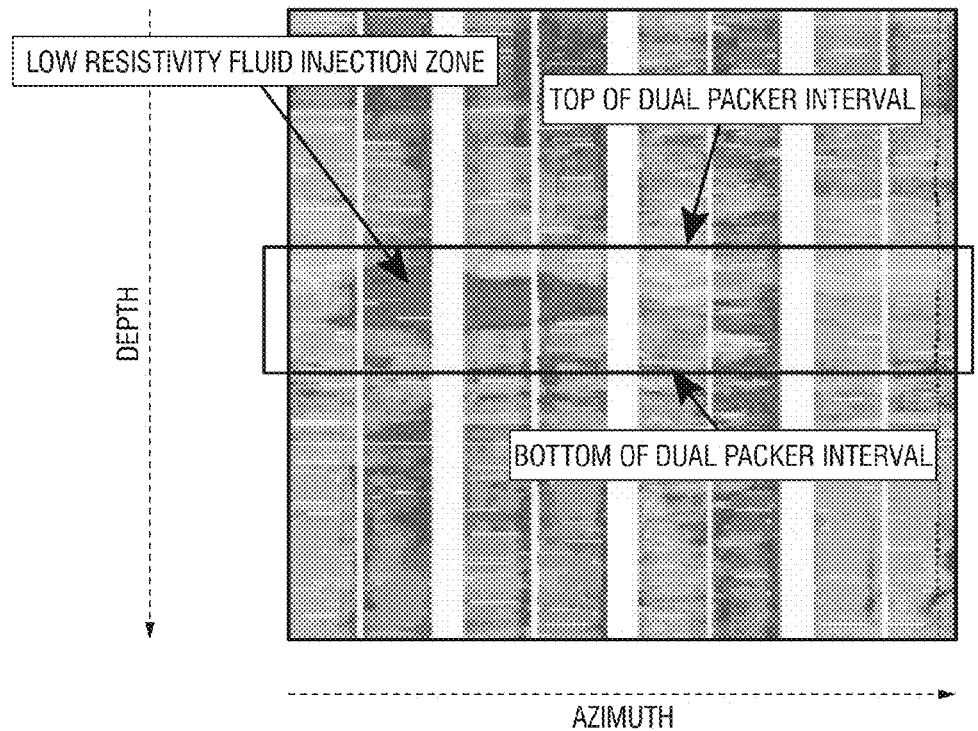
FIG. 1 shows an experimental result of an injection test using a formation tester having a straddle packer for injecting fluid into the formation.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure introduces a local Log-Inject-Log method. Also introduced is an apparatus combining an NMR tool with a wireline formation tester tool having either a probe or dual packer configuration.

A first step in the method includes logging the NMR tool over the zone to be injected, thereby obtaining a reference log. The NMR tool may be positioned at the depth of the test and then operated to obtain a reference MRF station (see U.S. Pat. No. 6,229,308, which is hereby incorporated herein by reference in its entirety). Subsequently, the formation tester tool is positioned at the test depth and a fluid is injected into the formation. Finally, the NMR tool is returned to the injection depth to perform a second log pass or MRF station.

The fluid may be carried down hole in a sample chamber and injected via a pumpout module of the formation tester tool. Alternately, the fluid may be pumped from the surface via tubing, such as coiled tubing.

The injected fluid may have properties which affect the response of the NMR tool. Example fluids which may be injected include $MnCl_2$-doped water and $D_2O$ (heavy water), although other fluids are also within the scope of the present disclosure. By injecting the fluid, the movable oil will be displaced and the remaining oil signal will be residual. An advantage of using $MnCl_2$-doped water is that most of the water signal may be killed or displaced to short T2 measurements, such that we may be able to obtain the volume of residual oil from the T2 distribution applying a cutoff. In an alternative embodiment, the injecting may be done at different rates and then checked to determine any differences.

In addition to the dopant agent, a radioactive tracer may be used to effectively map where the injected fluid in going into the formation. This may be accomplished by comparing gamma ray logs from the reference and after-injection passes.

Alternatively, the injection fluid may contain surfactants, solvents, stimulants, hydrocarbons, $CO_2$, ASP, polymers, steam, foam, and/or other fluid(s) that changes the mobility, wetting phase, and/or saturation of the reservoir fluid or the response of the NMR logging tool. An advantage of this methodology is that it is "differential" in that errors associated with the tool response to unchanging or static environmental characteristics such as formation lithology, porosity, and borehole conditions are potentially cancelled by subtracting two measurements before and after the injection.

One assumption, regardless of methodologies, is that the change to the fluid compositions in the zone of interest while the tools are being moved into position is negligible. Another approach would be to combine the NMR and formation tester tool into one apparatus so that the tools would not need to be moved. This may also allow for real-time monitoring while fluids are being injected and/or sampled to and from the formation.

One example includes positioning an NMR tool between two inflatable packers of the formation tester tool. This may have the advantage of design simplicity, although with some potential drawbacks. For example, when fluids flow to/from the formation tester tool packer interval and the formation, the fluids may not cross the sandface in a uniform manner. Instead, fluid movement may be confined to local zones randomly scattered within the packer interval. This can be seen in FIG. 1 which shows a log after injection of a low resistivity fluid (NaCl saturated water) using a dual packer. On the log, low resistivity is dark and high resistivity is bright. It can be seen that the fluid is injected into a limited area of the packer interval and not necessarily into the entire interval. Therefore, knowing exactly where the fluids entered/exited the formation within the packer interval may be impossible without making an auxiliary measurement.

A second disadvantage may be that fluid may be entering and exiting the formation within a formation tester tool packer interval at very low flow velocities because of the large surface area of the isolated borehole wall and because of the relatively slow speed of the formation tester tool pump. Therefore, piston-like displacement of reservoir fluids is not guaranteed.

A second approach may be to combine an NMR measurement on an formation tester tool having a probe assembly. This may have the advantage that flow to/from the reservoir is localized in a very small probe area and therefore flow characteristics are better determined. Sweep efficiency of formation fluids by injected fluids (or of invaded/injected fluids by formation fluids when sampling) might also be better because the flow velocity of injected/sampled fluids close to the probe can be much higher. This may yield a more accurate SOR or SWIR (Irreducible Water Saturation).

In one exemplary embodiment, the tool or tool string may include a telemetry module having gamma ray capabilities. The tool or tool string may alternatively or additionally include a General Purpose Inclinometry Tool (GPIT) configured to provide inclinometer measurements. Specifically, orientation may be defined by tool deviation, tool azimuth, and relative bearing, and the GPIT tool may use both a three-axis inclinometer and a three-axis magnetometer to make measurements for determining these parameters. The GPIT may also be used for orientation of the NMR Pad to line up with the formation tester injection. The tool or tool string may alternatively or additionally include a magnetic resonance tool that may be configured to make simultaneous multi-frequency measurements, for investigating the formation at multiple depths in a single pass. The tool or tool string may alternatively or additionally include a combinable magnetic resonance tool that may provide information about permeability, fluid identification and fluid contacts. Either or both resonance tools may be used in conjunction with an NMR tool with an eccentered configuration, which may be useful because its response has an azimuthal sensitivity and does not average the reading over the entire wellbore circumference.

The tool or tool string may alternatively or additionally include a formation tester tool comprising a power cartridge, a dual packer module, a pump module, and one or more sample chambers (one may be used as an exit port to the borehole and the others may be used to carry injection fluids downhole). A dual or straddle packer may be useful because it can be used for targeting a particular zone for the injection. In contrast, injecting in the entire well can require complex logistics and long rig time.

The tool or tool string may alternatively or additionally include a drilling or coring tool that may replace a dual packer module for injection. This may require the use of a low speed pump to ensure a low enough flowrate that the injection pressure stays low enough that the packer seal is not lost.

The tool or tool string may alternatively or additionally include a Fullbore Formation MicroImager (FMI) that may provide an electrical borehole image generated from up to 192 microresistivity measurements. Special focusing circuitry may ensure that the measuring currents are forced into the formation, where they modulate in amplitude with the formation conductivities to produce low-frequency signals rich in petrophysical and lithological information as well as a high-resolution component that provides microscale information used for imaging and dip interpretation. The FMI may be useful for determining exactly where the fluid was injected in the dual packer interval, such as if the injection fluid resistivity contrasts with the connate water resistivity.

These tools may be conveyed on wireline, or on drill pipe or tubing which allows dynamic control of the tool orientation and supports larger tool weight relative to wireline. Tubing may be useful because it may help place the NMR tool at the injection point, because depth control may be better relative to wireline cable. Furthermore, tubing may help when rotating the NMR tool to get a plurality of measurements or to more correctly locate a specific measurement. Tubing may also be used to convey fluids for injection into the formation.

Optionally, the tools can be run sequentially, whether on wireline or tubing. For example, one embodiment of a method within the scope of the present disclosure includes logging the well with NMR, then injecting with the formation tester tool, then logging again with FMI (if required), and then logging with NMR again. Sequential logging strings may be operationally less complex but may cost more rig time, and they may experience a less negligible effect from changes to the fluid saturations between the injection and the NMR evaluation.

As described above, an accurate analysis of residual oil saturation following injection, amongst other formation properties, can be a crucial aspect of efficiently designing a production scheme of a hydrocarbon bearing formation and reservoirs. Using methods and apparatus for testing and evaluating underground formation described herein, such analysis may be performed in situ. Also, in contrast with conventional well injection techniques, the methods and apparatus for testing and evaluating underground formation described herein may utilize local injection techniques, wherein a portion of the wellbore wall is isolated from a wellbore fluid for injecting a fluid into the formation. Local injection techniques as described herein may have the benefit of reducing the logistics and rig time required to perform reservoir evaluation, and in particular the determination of residual oil saturation. Further, local injection techniques may reduce the required volume of injection fluid and may permit using various injection fluids, thereby improving the testing flexibility and further reducing the testing cost.

The present inventors have discovered and experimentally verified that local injection is achievable using a formation tester having a straddle or dual packer and/or a probe assembly for establishing a fluid communication between the formation tester and an isolated portion of the wellbore wall. However, in these cases, a uniform injection all around the wellbore may not be obtained systematically. Thus, novel and improved methods and apparatus for testing and evaluating underground formation may be required for accurately evaluating a formation response to such injection. In particular, the novel and improved methods and apparatus should preferably be capable of determining at least one injection spot where the injection has been successful, for example from auxiliary measurements. Consequently, a formation property representative of the injection spot may be determined.

FIG. 1 shows a log measured after injection of a low resistivity fluid (NaCl-saturated water) using a straddle or dual packer disposed on a Modular Dynamics Formation Tester (MDT, a trademark of Schlumberger Technology Corporation). The log is acquired using a Fullbore Formation Microlmager (FMI, a trademark of Schlumberger Technology Corporation) that provides an electrical borehole image generated from micro-resistivity measurements. As described above, low resistivity areas of the formation are shown as dark areas and high resistivity zones are shown as bright areas as a function of driller depth and azimuth. Also depicted in FIG. 1 is the zone that has been isolated between the upper and lower packers to establish a fluid communication with the formation. In this test, the lower and upper packers are around four feet apart. During this test, injectivity has been established by drawing fluid into the tool at a sufficient rate for breaching the mudcake and cleaning the invasion zone from particles that may have invaded the formation during seepage of wellbore fluid into the formation. Preferably, the drawing operation is monitored using flow rate and pressure sensors for monitoring a wellbore pressure in the sealed interval. The pressure data may be analyzed for identifying that the mudcake is breached by determining that formation fluid is capable of flowing into the tool. Then, around eight gallons of NaCl-saturated water have been pumped out of the testing tool.

As can been seen in FIG. 1, injection fluids that flow from the interval sealed with formation tester tool packers to the formation may not necessarily flow through the sandface of the formation in a spatially uniform manner. The fluid injection may be generally confined to local zones randomly scattered within the packer interval (see the low resistivity injection zone on FIG. 1). Thus, the fluid may be injected into a limited area of the packer interval and not necessarily the entire interval. Additionally, the injected fluid may be entering the formation isolated within a formation tester tool packer interval at low and variable flow velocities, because of the large surface area of the isolated borehole wall and because of the relatively slow pumping rate of the formation tester tool pump. Therefore, piston-like displacement of reservoir fluids may not be guaranteed. Consequently, knowing exactly where and/or how deep the fluids entered the formation within the packer interval may prove difficult without making an auxiliary measurement. Methods to alleviate the non-uniformity of the injection may therefore be needed for accurate formation testing and evaluation following the injection, as further detailed below in the description of FIGS. 3, 4, 5A, and 5B.

Figure 2:
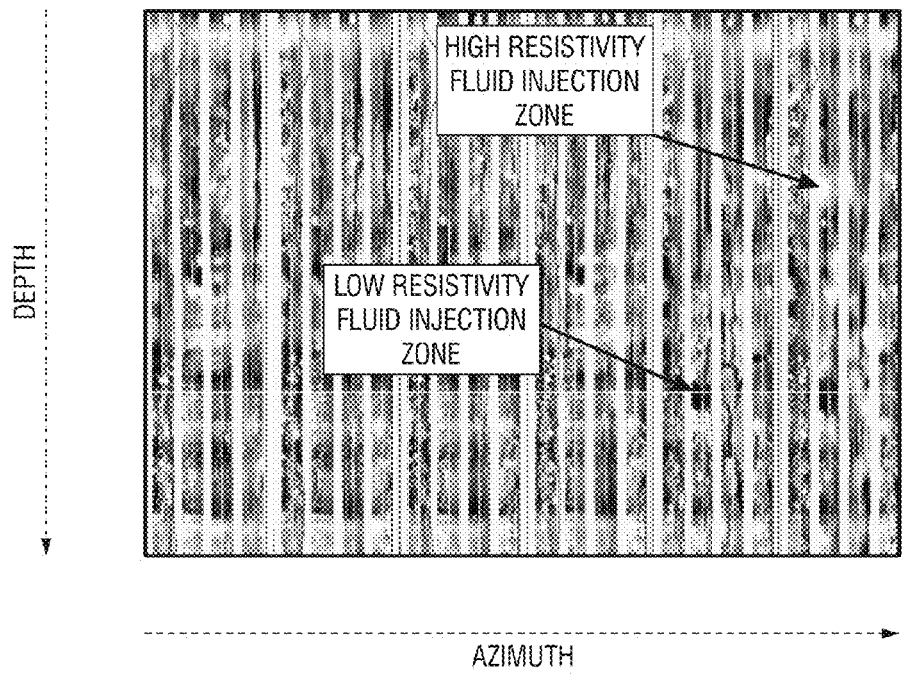
FIG. 2 shows another experimental result of an injection test using a formation tester having a probe for injecting fluid into the formation.

FIG. 2 shows a log measured after injection of a low resistivity fluid (e.g., NaCl-saturated water) at a first location and a high resistivity fluid (e.g., gasoline) at a second location using a probe disposed on a modified version of a Cased Hole Dynamics Tester (CHDT, a trademark of Schlumberger Technology Corporation). In particular, the CHDT was provided with an extendable probe, such as described in the co-owned U.S. Pat. No. 7,380,599. The log is again acquired using an FMI that provides an electrical borehole image generated from micro-resistivity measurements. On the log, low resistivity areas of the formation are shown as dark areas and high resistivity zones are shown as bright areas as a function of driller depth and azimuth. Also indicated in FIG. 2 are the two zones that have been isolated with an extendable probe to establish a fluid communication with the formation. During this test, injectivity has been established by drilling a perforation (around six inches long) through the mudcake and through at least a portion of the near wellbore damaged zone that may have formed while particles have invaded the formation during seepage of wellbore fluid into the formation. Then three gallons of NaCl-saturated water and eleven gallons of gasoline have been injected in the two zones, respectively.

As can been seen in FIG. 2, using a probe may in some cases have the advantage that the flow of injection fluid to the reservoir is localized in a very small probe area and therefore flow characteristics may be better determined. Also, sweep efficiency of formation fluids by injected fluids may be better because the flow velocity of injected fluids close to the probe is much higher. Thus, using a probe tool for injection may yield a more accurate SOR or SWIR (Irreducible Water Saturation). However, the fluid injection is again confined to local zones (see the low and high resistivity injection zone on FIG. 2). Therefore, aligning or orienting a formation evaluation sensor with the injection spot may prove difficult without making an auxiliary measurement. Methods to alleviate the limited spatial extent of the injection into the formation may therefore be needed for accurate formation testing and evaluation following the injection, as further detailed below in the description of FIGS. 3, 4, 5A and 5B.

In accordance with the present disclosure, an example method for evaluating a formation involves lowering a downhole tool in a wellbore penetrating the formation, evaluating formation properties using a sensor in the downhole tool, injecting a fluid into the formation via the downhole tool at an injection zone, and repeating the formation property evaluation after injecting the fluid using the formation evaluation sensor in the wellbore close to the injection zone. The formation evaluation sensor is moved to a plurality of locations in the wellbore, and the formation property evaluation is repeated at the plurality of locations in the wellbore using the sensor. At least two of the plurality of the repeated measurements are compared, and a formation property is determined based on the comparison.

In accordance with the present disclosure, another exemplary method for evaluating a formation involves lowering a downhole tool in a wellbore penetrating the formation, evaluating formation properties using a sensor in the downhole tool, injecting a fluid into the formation via the downhole tool at an injection zone, and repeating the formation property evaluation after injecting the fluid using the formation evaluation sensor in the wellbore close to the injection zone, the formation evaluation sensor having a larger sensitivity in an angular sector. The angular sector in which the formation evaluation sensor has a larger sensitivity is oriented relative to the injection zone. Using the sensor in the oriented position, at least one repeated measurement is performed, and a formation property is determined based on the repeated measurement.

In accordance with the present disclosure, yet another exemplary method for evaluating a formation involves lowering a downhole tool in a wellbore penetrating the formation, evaluating formation properties using a sensor in the downhole tool, injecting a fluid into the formation via the downhole tool at an injection zone, and repeating the formation property evaluation after injecting the fluid using the formation evaluation sensor in the wellbore close to the injection zone. The formation evaluation sensor is moved to a plurality of locations in the wellbore, and the formation property evaluation is repeated at the plurality of locations in the wellbore using the sensor. At least one injection spot where the injection has been successful is determined from the plurality of measurements, and a formation property representative of the injection spot is determined.

Figure 3:
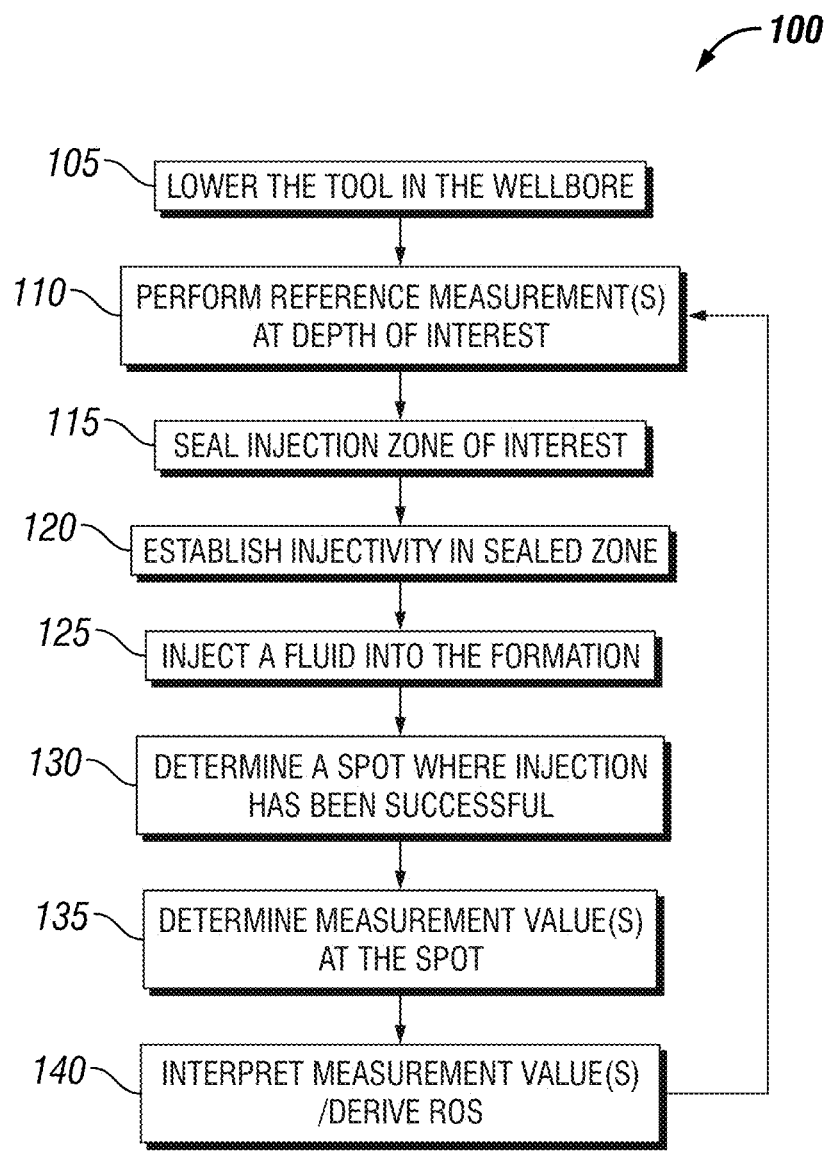
FIG. 3 is a flow chart describing an example method for testing and evaluating a formation using a localized injection.

FIG. 3 is a flow chart describing an exemplary method 100 for testing and evaluating a formation using a localized injection according to one or more aspects of the present disclosure. For example, the method 100 may be used to determine a residual oil saturation. The method 100 may be performed with various formation testers and formation evaluation tools, as they are known in the art or developed in the future. In addition, the method 100 may also be performed with the apparatus described in more details below in FIGS. 6, 7, 8, and 9.

A testing tool or testing tool string is lowered in a wellbore (block 105). In cases where the testing tool string weight is sufficiently low, the testing tool may be conveyed via wireline, which has the advantage of being relatively easily deployed. Alternatively, the testing tool may be conveyed via drill pipe or tubing. Tubing or pipe conveyance may also be preferable because it allows dynamic control of the tool position and thereby helps placing a formation evaluation sensor at the injection point, as further detailed below. In particular, tubing or pipe conveyance may provide a better depth control than a cable. Furthermore, tubing or pipe conveyance may be used to rotate or orient the formation evaluation sensor in order to perform a plurality of measurements at different azimuth and/or to perform a measurement correctly located with respect to an injection point.

Regardless of the conveyance means, one or more reference measurements may optionally be performed (block 110). For example, the operation in block 110 may include logging the zone to be injected to obtain a reference log. Alternatively, or additionally, a formation evaluation sensor may be positioned at the depth of the test and a reference measurement may be performed. For measurement applications linked to the measurement of the oil saturation, Nuclear Magnetic Resonance, Dielectric or Electric Permittivity, Sigma Neutron Capture, Carbon/Oxygen, and Resistivity are all valid measurements that may be considered for performing the reference measurement, either separately or combined. In addition, one or more sensors sensitive to a tracer introduced in the injection fluid (e.g., a radioactive tracer) may also be used. However, regardless of the measurement physics, it is preferable to use one or more formation evaluation sensors configured to have a larger sensitivity in a given angular sector. In contrast to sensors that have a uniform azimuthal sensitivity, these sensor are better suited for providing wellbore images and/or align with a confined injection zone, as will be further detailed below.

In some cases, a depth of interest may be selected from the reference measurements or reference log. A testing tool sealing member (e.g., a straddle packer or probe) is then aligned with the depth of interest for sealing the injection depth of interest (block 115). One or more techniques may be used to precisely align the position of the sealing member with the depth of interest and/or record this position. In one example in which the testing tool is conveyed via wireline, techniques such as cable flagging may be used to improve the positional agreement of the sealing member with the selected depth of interest. Additionally, the geological features detected by a natural gamma ray sensor and/or other imaging sensor (e.g., micro-resistivity sensor) may be concurrently used with the depth provided by a surface unit to further improve the positional agreement of the sealing member with the selected depth of interest. In another example in which the testing tool is conveyed on pipe or tubing, the pipe or tubing may be manipulated at the surface to orient the testing tool in the wellbore as desired. Additionally, an operator at the surface may monitor the orientation of the testing tool determined by the magnetometers and inclinometers provided by a General Purpose Inclinometry Tool (GPIT, a trademark of Schlumberger Technology Corporation). Specifically, orientation is defined by tool deviation, tool azimuth, and relative bearing. The GPIT tool uses both a three-axis inclinometer and a three-axis magnetometer to make measurements for determining these parameters. Once the sealing member is adequately aligned, it may be extended towards the wellbore wall into sealing engagement with a portion of the formation. Thereby, a fluid communication between the testing tool and the formation is established across the wellbore.

In some cases, it may then be advantageous to establish injectivity in the sealed zone (block 120). Indeed, when an impermeable mud cake is suspected, or when a damaged zone in the formation comprising particles that may clog the porosity system of the formation is suspected, establishing the injectivity prior to injection may prevent or reduce the risk of unintentionally fracturing the formation while injecting a fluid. Regardless of the type of sealing member (e.g., probe or packer), injectivity may be established by pumping formation fluid into the formation tester at sufficient rate. By doing so, the mudcake may be breached at one or more points in the sealed area. Monitoring the pressure in the sealed interval may be used to identify that the mudcake has been breached. Additionally, a pretest may be performed for measuring the formation pressure and formation fluid mobility. These formation parameters may in turn be used for controllably injecting fluid into the formation. Also, the mudcake and damaged zone may be perforated at one or more locations in the sealed interval, for example using a drilling bit or other perforating device. Other methods for establishing injectivity include chemical treatment, for example as described in co-owned U.S Patent Application Pub. No. 2008/0066535.

Regardless on the technique used to establish the injectivity, a fluid is then injected into the formation through at least a portion of the sealed area (block 125). The injection pressure may be measured during the injection and maintained at a level between a measured formation pressure and a measured wellbore pressure. Thus, the injection pumping rate may be controlled based on a measured pressure in the sealed zone. In one example, the injection fluid may be conveyed downhole in one or more containers operatively coupled to an injection pump and preferably compensated at the wellbore pressure. Relatively large volumes may be needed for insuring a proper injection. For example, in cases where a straddle packer is used, a volume in excess of the wellbore volume sealed between the packers is preferable. Depending on the packer spacing, and the wellbore diameter, this volume may be larger than six and sometimes twelve gallons. Thus, the containers should be adequately sized to provide at least this volume in addition to the volume desired for injection into the formation (e.g., twelve gallons or more). In another example in which the testing tool is conveyed via tubing or pipe, the inner bore of the tubing may also be used to convey fluids for injection into the formation tester. Alternatively, the injection fluids may be pumped in the well above the formation tester, and a pump in the formation tester may be used to inject the fluids pumped in the well into the formation.

The injected fluid may be water in bottom drive reservoirs, or gas in top drive reservoirs. Alternatively, the injected fluid may be representative of fluid injected in production operations, such as steam, and may also contain surfactants, solvents, stimulants, hydrocarbons, CO2, ASP, polymers, steam, foam, and/or other fluid that changes the mobility, wetting phase, or residual saturation of the reservoir fluid. The injected fluids may have properties which affect the response of the deployed formation evaluation sensor. In one example in which an NMR sensor is used to perform measurements on the formation (at blocks 110 and 135 for example), the injected fluid may be Manganese Chloride (MnCl2) doped water. The injected fluid may alternatively or additionally comprise D2O (heavy water). One advantage of using MnCl2-doped water or heavy water is that most of the water response signal is of reduced amplitude or displaced to short T2 relaxation times. In particular, the MnCl2-doped water or heavy water response signal is essentially distinct from the response signal of hydrocarbon (e.g., oil). Thus, it is possible to isolate the hydrocarbon response in the measurement, thereby increasing the probability of obtaining the volume of residual hydrocarbon from the T2 distribution applying a cutoff below sufficiently short T2 relaxation times to the measurement. In another example in which a resistivity sensor is used to perform measurements on the formation (at blocks 110 and 135 for example), the injected fluid may be Sodium Chloride (NaCl) saturated water. One advantage of using NaCl-saturated water is that the resistivity of the injected fluid is low compared to the resistivity of hydrocarbons. In yet another example in which a gamma ray sensor is used to perform measurements on the formation (at blocks 110 and 135 for example), a radioactive tracer may be added to the injection fluid to effectively map where the saturation of the injected fluid injected into the formation, and consequently the saturation of the residual oil.

As shown in the test results of FIGS. 1 and 2, the injection is not systematically uniform. Therefore, to provide accurate formation evaluation results, it may be useful to at least determine a spot where injection has been successful (block 130). For example, this operation may involve performing auxiliary measurements (e.g., depth measurement, azimuth and inclination measurement, imaging, etc.), as further described below in FIGS. 4, 5A, and 5B. To perform these auxiliary measurements and/or the measurement at the stop where the injection has been successful, the sealing member may be retracted to disengage the formation tester from the formation wall.

During or after the determination of a spot where injection has been successful, a measurement value at the spot where injection has been successful is determined (block 135). An operator at the surface or an automated system may check the agreement between the angular and/or depth position of the sensitivity volume of the formation evaluation with the spot where the injection has been successful. This operation usually involves orienting or moving the formation evaluation sensor to align its sensitivity zone to a zone of the formation where the injection has been successful. It should be noted here that it is assumed that the spatial resolution of the formation evaluation sensor is at most equal to the extent of a successful injection zone. If it is determined that this is not the case, the injection operation may be repeated using for example a larger injected volume into the formation.

Optionally, the measured value(s) at block 135 may be interpreted (block 140), for example to determine residual oil saturations, irreducible water saturation, wettability, or relative permeability curves, among other formation and/or fluid properties. In particular, by injecting fluid into the formation at block 125, the movable oil (or hydrocarbon) will be displaced and the remaining oil will be indicative of the residual oil saturation. In addition, the interpretation at block 140 may involve the comparison of values obtained from the reference measurement(s) performed at block 110 and values obtained from measurement(s) performed at block 130. One advantage of this methodology is that it is "differential" in that errors associated with the tool response to unchanging or static environmental characteristics such as formation lithology, porosity, and borehole conditions are potentially cancelled by subtracting two measurements before and after the injection.

As indicated in FIG. 3, one or more of the operations associated with blocks 110, 115, 120, 125, 130, 135, and 140 may be repeated any number of times as desired. In one example implementation, the injection may be repeated at different rates or using different injection fluids and the measurements be checked to analyze any differences.

While FIG. 3 has been described in the particular case in which operations are performed during a single run, it should be appreciated that one or more tool strings can optionally be run sequentially in the wellbore, each conveyed via wireline or tubing. Sequential logging runs are operationally less complex. However, sequential logging runs cost more rig time and the effect from changes to the fluid saturations between the injection and formation evaluation are potentially more pronounced.

Figure 4:
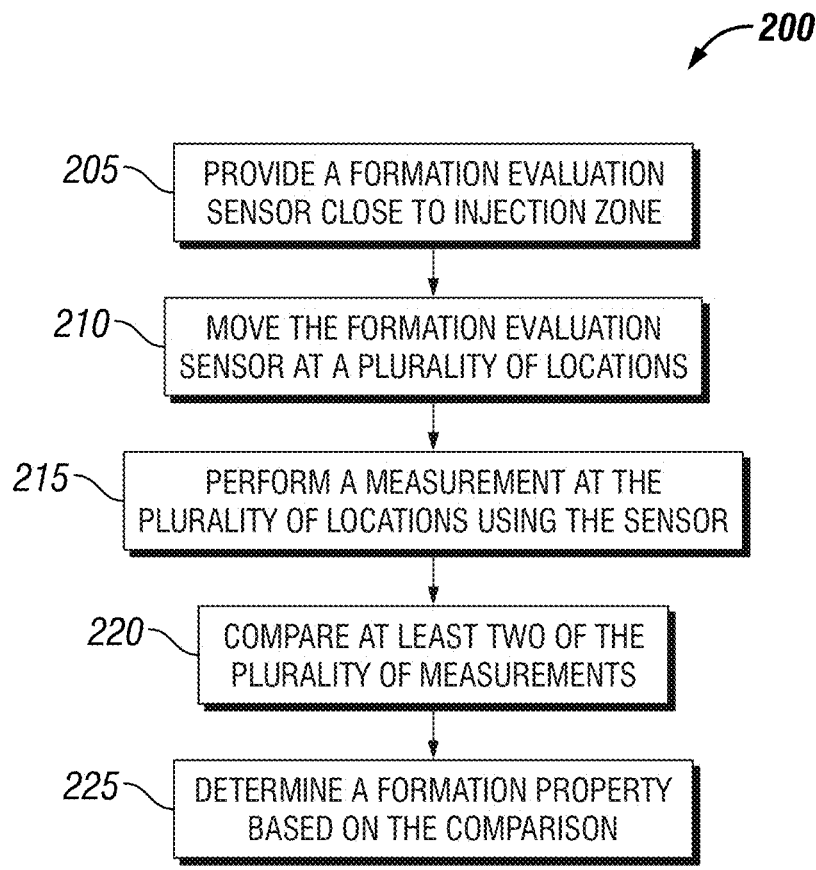
FIG. 4 is a flow chart describing an example method for selecting a particular spot where the injection has been successful from a plurality of measurements.
Figure 5A:
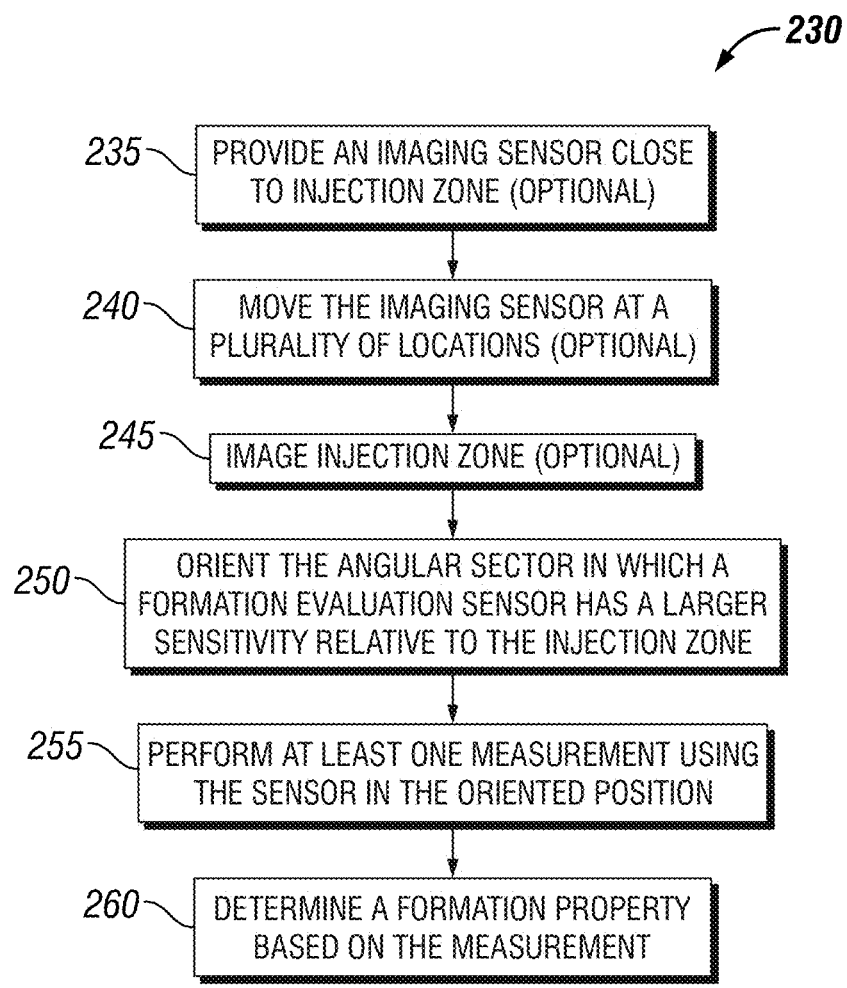
FIG. 5A is a flow chart describing an example method for orienting a formation evaluation sensor with respect to a particular spot where the injection has been successful.
Figure 5B:
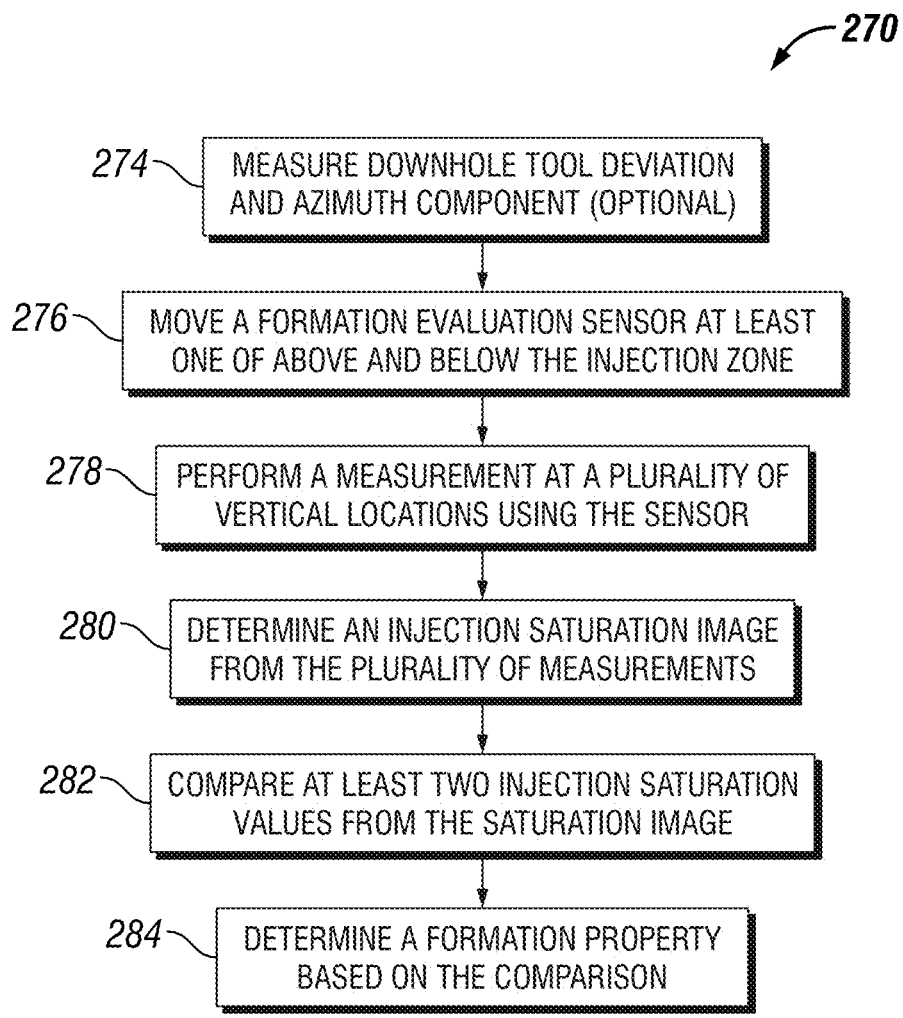
FIG. 5B is a flow chart describing another example method for orienting a formation evaluation sensor with respect to a particular spot where the injection has been successful.

FIGS. 4, 5A, and 5B illustrate example methods for selecting a particular spot where the injection has been successful and for determining a formation property at the selected point. The methods of FIGS. 4, 5A, and 5B may be implemented separately or in combination. When implemented in combination, the methods of FIGS. 4, 5A, and 5B may provide a relatively more accurate selection of a particular spot where the injection has been successful, and thereby a relatively more accurate determination of formation and/or fluid property.

Turning to FIG. 4, illustrated is a flow chart describing an example method 200 for selecting a particular spot where the injection has been successful from a plurality of measurements. The method 200 may be implemented using for example the apparatus described in FIG. 6, 7, 8, or 9. However, other apparatus may be used to implement the method 200.

A formation evaluation sensor (e.g., the NMR sensor 345 in FIG. 6, the NMR sensor 446 in FIG. 7, each of the microresistivity sensors of the FMI tool 530 in FIG. 8, or the NMR sensor 613 of FIG. 9) is provided close to injection zone (block 205). Then, the formation evaluation sensor is moved to a plurality of locations (block 210). The plurality of locations may include one or more of a plurality of azimuthal locations in the wellbore, a plurality of axial locations in the wellbore, or a combination thereof. A measurement is performed at the plurality of locations using the sensor (block 215).

In this method, the particular spot where the injection has been successful is indentified for example by the spot at which the oil saturation (or the difference between the reference oil saturation and the oil saturation measured after injection) is the lowest. In these cases, it is assumed that the formation has been less efficiently flushed at the injection zones other than the spot at which the oil saturation is the lowest. Thus, at least two of the plurality of measurements are compared (block 220). Then, a formation property is determined based on the comparison (block 225). For example, the measurement having the value corresponding to the lowest oil saturation may indicate the residual oil saturation.

While the method 200 has been described in a particular case where a measurement indicative of the lowest oil saturation is used to determine the point at which the injection is successful and a formation property at this point, in other cases (such as when injecting oil) other comparisons may be performed at block 220.

Turning now to FIG. 5A, a flow chart describing an example method 230 for orienting a formation evaluation sensor with respect to a particular spot where the injection has been successful is disclosed. The method 230 may be implemented using for example the apparatus described in FIG. 8. However, other apparatus may be used to implement the method 230.

An imaging sensor (e.g., the sensor 530 of FIG. 8) is provided close to an injection zone (block 235). Then, the imaging sensor is moved to a plurality of locations (block 240) for imaging the injection zone (block 245). The image is used to identify at least one spot at which the injection is successful, for example as shown in FIGS. 1 and 2. In particular, the azimuth and/or depth of a spot at which the injection is successful may be determined.

Based on the information collected on the image, an angular sector in which a formation evaluation sensor (e.g., NMR sensor 541) has a larger sensitivity is oriented relative to the injection zone (block 250). For example, one or more of a downhole tool deviation component with respect to the Earth's gravitational field and a downhole tool azimuth component with respect to the Earth's magnetic field may be measured (e.g., with the GPIT 527 in FIG. 8) to determine the azimuth of the angular sector in which the formation evaluation sensor has a larger sensitivity. Then, the formation evaluation sensor may be oriented (for example by rotating a tubing string from the surface) based on one or more of the measured downhole tool deviation component and the measured downhole tool azimuth component.

At least one measurement is performed using the sensor in the oriented position (block 255). However, it may be also useful in some cases to move the formation evaluation sensor above and below the injection zone or azimuthally adjacent to the injection zone. Then, a formation property is determined based on the measurement (block 260).

Turning now to FIG. 5B, a flow chart describing another example method 270 for orienting a formation evaluation sensor with respect to a particular spot where the injection has been successful is disclosed. The method 270 may be implemented using for example the apparatus described in FIG. 9. However, other apparatus may be used to implement the method 270.

A downhole tool deviation and azimuth component is measured (e.g., using the tool 603 in FIG. 9) (block 272). Then, a formation evaluation sensor is moved above and below the injection zone (block 276). A measurement is performed to a plurality of vertical locations using the sensor (block 278).

In this method, it is assumed that the spot at which the injection has been successful and the formation evaluation sensor are initially aligned (which is the case, for example, when a probe tool is used for injection). While moving the formation evaluation sensor above and below the injection zone, special care should be taken to conserve this alignment and/or steer the tool along a particular azimuth.

An injection saturation image is then determined from the plurality of measurements (block 280). In some cases, the plurality of measurements may be jointly inverted to provide a saturation image. At least two injection saturation values from the saturation image are compared (block 282) and a formation property is determined based on the comparison (block 284). For example, the formation property may be the lowest saturation value, as discussed previously therein.

Figure 6:
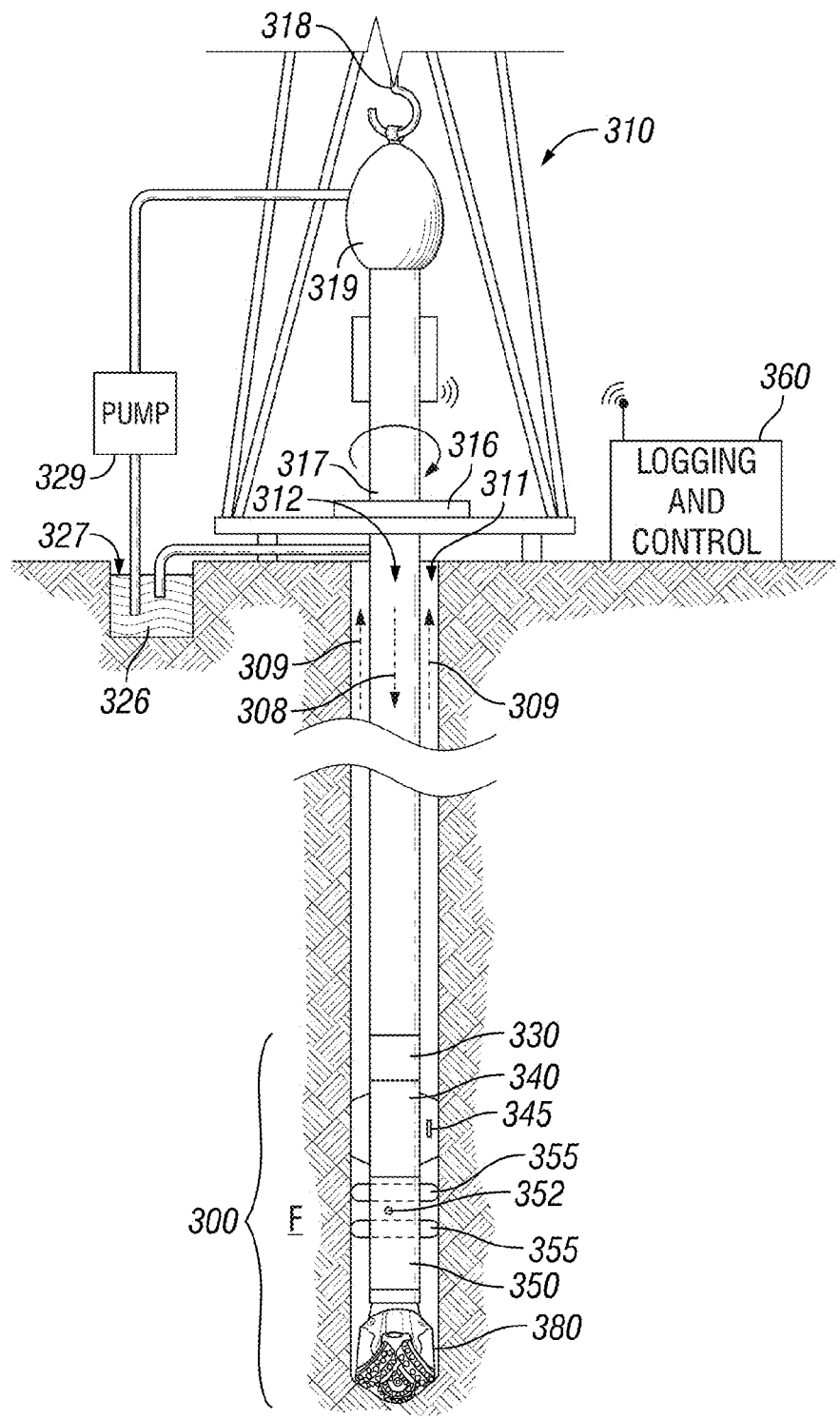
FIG. 6 shows a block diagram of an example apparatus that is conveyed on drill pipe or tubing for allowing dynamic control of an NMR sensor orientation.

FIG. 6 illustrates an example wellsite system that can be employed onshore and/or offshore and which may employ one or more aspects of the example formation evaluation methods described herein. In the example wellsite system of FIG. 6, a borehole 311 is formed or has been formed in one or more subsurface formations by rotary and/or directional drilling. A drill string or tubing string 312 is suspended within the borehole 311 and has a bottom hole assembly (BHA) 300. In some implementations, the BHA 300 may have a drill bit 380 at its lower end. A surface system includes a platform and derrick assembly 310 positioned over the borehole 311. The assembly 310 includes a rotary table 316, a kelly 317, a hook 318, and a rotary swivel 319. The drill string 312 is rotated by the rotary table 316, energized by means not shown, which engages the kelly 317 at the upper end of the drill string or tubing string 312. The example drill string 312 is suspended from the hook 318, which is attached to a traveling block (not shown), and through the kelly 317 and the rotary swivel 319, which permits rotation of the drill string 312 relative to the hook 318. Additionally, or alternatively, a top drive system could be used.

In the example of FIG. 6, the surface system further includes drilling fluid or mud 326 stored in a pit 327 formed at the well site. A pump 329 delivers the drilling fluid 326 to the interior of the drill string 312 via a port in the swivel 319, causing the drilling fluid to flow downwardly through the drill string 312 as indicated by the directional arrow 308. The drilling fluid 326 exits the drill string 312, for example via ports in the drill bit 380, and then circulates upwardly through the annulus region between the outside of the drill string and the wall of the borehole, as indicated by the directional arrows 309. However, the drilling fluid 326 may exit the drill string 312 at other locations, in particular if the drill bit 380 is not used. The drilling fluid 326 may be used to lubricate the drill bit 380, and/or to carry formation cuttings up to the surface as it is returned to the pit 327 for recirculation.

The example BHA 300 of FIG. 6 includes, among other things, any number and/or types of logging-while-drilling (LWD) modules (two of which are designated at reference numerals 340 and 350) and/or measuring-while-drilling (MWD) modules (one of which is designated at reference numeral 330), and optionally a roto-steerable system and motor, operatively coupled to the example drill bit 380.

The example LWD modules 340 and 350 of FIG. 6 are each housed in a special type of drill collar as it is known in the art and each contain any number of logging tools and/or fluid sampling and analysis devices. The example LWD modules 340 and 350 include capabilities for measuring, processing, and/or storing information, as well as for communicating with surface equipment, such as a logging and control computer 360 via, for example, the MWD module 330.

The example MWD module 330 of FIG. 6 is also housed in a special type of drill collar and contains one or more devices for measuring characteristics of the drill string 312 and/or the drill bit 380. The example MWD tool 330 further includes an apparatus (not shown) for generating electrical power for use by the downhole system. Example devices to generate electrical power include, but are not limited to, a mud turbine generator powered by the flow of the drilling fluid, and a battery system. Example measuring devices include, but are not limited to, a weight-on-bit measuring device, a torque measuring device, a vibration measuring device, a shock measuring device, a stick slip measuring device, a direction measuring device, and an inclination measuring device.

In the example implementation of FIG. 6, the LWD module 340 is provided with a Nuclear Magnetic Resonance (NMR) formation evaluation sensor 345, disposed about a centralizer blade. The magnetic resonance sensor is preferably able to make simultaneous multi-frequency measurements, for investigating the formation at multiple depths in a single pass and/or may provide information about permeability, fluid identification and fluid contacts. As discussed previously, the NMR sensor 345 is implemented with an eccentered configuration in which the sensor 345 has a larger sensitivity in an angular sector. This particular configuration may be useful because its response has an azimuthal sensitivity and does not average the reading over the entire wellbore circumference. However, other formation evaluation sensors may be used alternatively or additionally to the NMR sensor 345.

Still in this example implementation of FIG. 6, the LWD module 350 is implemented as a formation tester having a straddle packer 355 selectively extendable (e.g., inflatable) into sealing engagement with the formation. The straddle packer may be used to isolate a portion of the wellbore wall and establish a fluid communication between an injection port 352 on the body of the formation tester 350 and the formation F. The formation tester 350 is capable of injecting one or more fluids into the formation F. The injection fluids may be carried downhole in a sample chamber (not shown) and injected via a pump (not shown) of the formation tester tool. Alternatively, the fluid may be pumped from the surface via the inner bore of the drilling or tubing string 312.

The BHA 300 of FIG. 6 may be used to implement a local Log-Inject-Log method, such as the method described in FIG. 3. Indeed, the BHA 300 combines an NMR tool 340 with a formation tester tool 350 having a dual packer configuration. The method would involve the step of logging the zone to be injected to obtain a reference log using the NMR tool 340.

Alternatively, the NMR tool could be positioned at the depth of the test to perform a reference MRF station (see, e.g., U.S. Pat. No. 6,229,308, which is incorporated herein by reference in its entirety). Subsequently, the formation tester tool 350 is set at the test depth and is used for injecting a fluid into the formation. The packers 355 are then retracted (e.g., deflated) for allowing movement of the BHA 300. Finally, the BHA 300 is manipulated via the drill string or tubing string 312 at the surface for returning to the injection depth with the NMR tool 340 and then performing a second log pass. The second log pass measurements may be performed according to the example method described in FIG. 4, for example. Additionally, an MRF station may be performed at a spot where the injection has been successful. For example, the MRF station may be performed after orienting the angular sector in which the NMR sensor 446 has a larger sensitivity relative to a spot where the injection has been successful. In this example, the MWD tool 330 may be used for measuring one or more of a downhole tool deviation component with respect to the earth gravitational field and a downhole tool azimuth component with respect to the earth magnetic field. The NMR sensor 446 may then be oriented based on one or more of the measured downhole tool deviation component and the measured downhole tool azimuth component.

Further, the example method for selecting a particular spot where the injection has been successful from a plurality of measurements described herein in FIG. 4 may be implemented by controlling the operations of the drill string 312, including the components of the BHA 300, via the logging and control computer 360. For example, the example process of FIG. 4 may be implemented in conjunction with the logging and control computer 360 to control one or more of the LWD modules 340 and 350 and/or the MWD module 330 to control or measure one or more of the orientation, inclination, and depth of the formation evaluation sensor 345, as well as the operations associated with the measurements performed by the sensor 345.

One assumption made while using the system shown in FIG. 6, regardless of the measurement technology implemented by the sensor 345, is that the change to the fluid compositions in the zone of interest while the tools are being moved into position is negligible. Another approach would be to combine the formation evaluation sensor and formation tester tool into one apparatus, as further described in FIG. 7.

Figure 7:
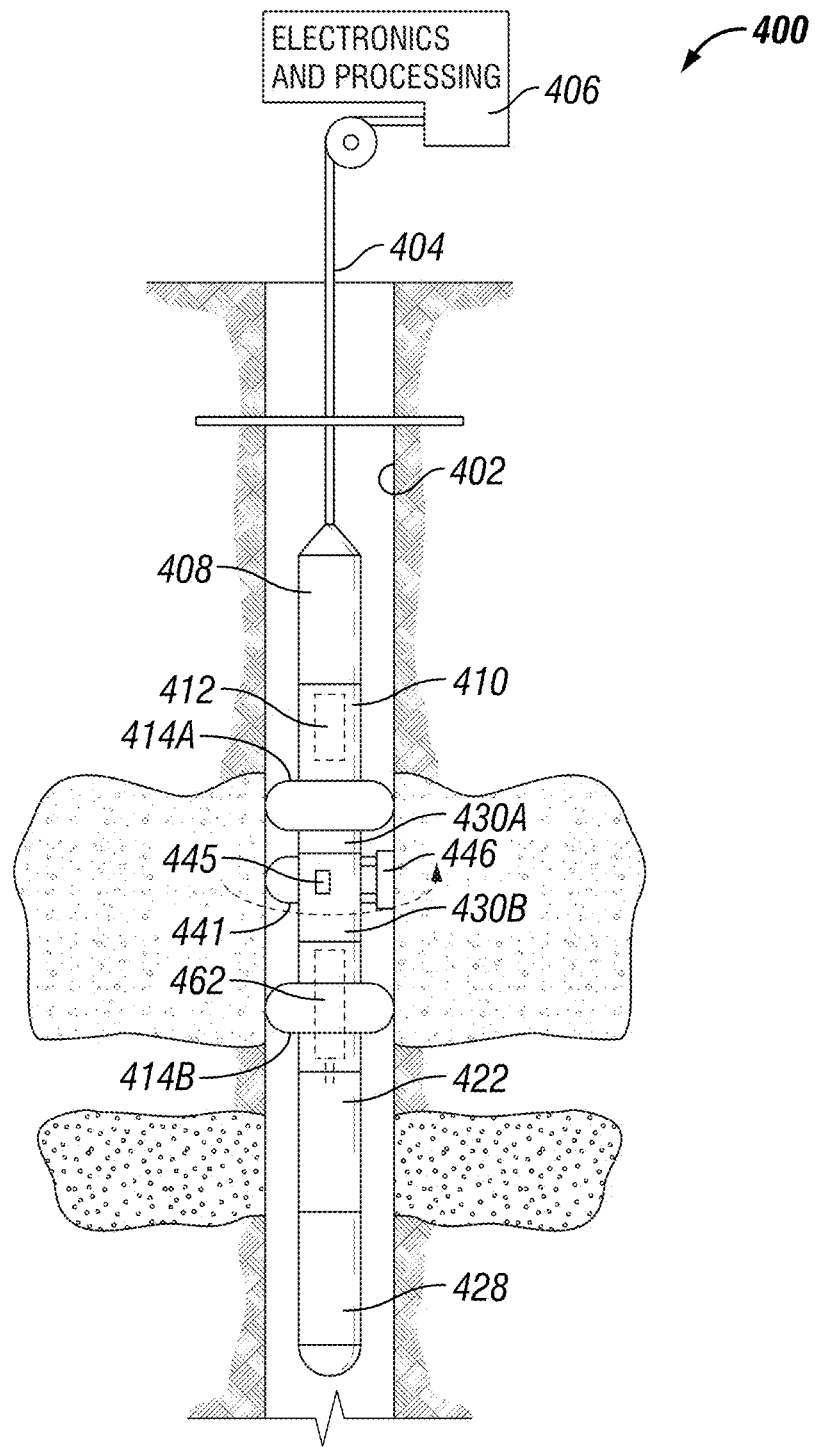
FIG. 7 shows a block diagram of another example apparatus that is provided with an NMR sensor selectively positionable between two inflatable packers.

Turning to FIG. 7, an example wireline tool 400 that may be used for testing and evaluating underground formation using localized injection techniques is suspended in a borehole or wellbore 402 from the lower end of a multiple conductor cable 404 that is spooled on a winch (not shown) at the surface. At the surface, the cable 404 is communicatively coupled to an electrical control and data acquisition system 406. The tool 400 includes an elongated body 408 that includes a module 410 having a tool control system 412 configured to control at least some of the operations of the wireline formation tester 400.

The wireline tool 400 also includes a formation tester 460 having selectively extendable (e.g., inflatable) packers 414a, 414b configured to selectively seal off or isolate selected portions of the wall of the wellbore 402 to fluidly couple the adjacent formation F and draw fluid samples from the formation F. The formation tester 460 also includes one or more fluid storage chambers 422 and 424, which may receive and retain injection fluid at the surface for subsequent testing. A downhole injection pump 462 may also be provided, through which the injection fluid stored in one or both chambers 422 and 424 is controllably flown. The fluid may thereafter be expelled through a port between the packers 414a and 414b and forcibly introduced in the formation. Alternatively, the downhole injection pump 462 may be utilized in reverse direction for extracting fluid from the formation and breaching the mudcake. The fluid may thereafter be expelled through a port, or it may be sent to one or more fluid storage chambers 422 and 424, which may collect the formation fluid for subsequent testing at the surface or a testing facility.

In the example wireline tool 400 of FIG. 7, an NMR sensor 446 is positioned between the packers 414a, 414b of the formation tester 460 and applied against the formation with a bow spring 441. This would have the advantage that the formation tester tool may not need to be moved for performing measurements in the injected zone. As a consequence, the seal created by the packers 414a and 414b may not need to be broken, therefore limiting the invasion of the formation in the injected area by wellbore fluids that may otherwise occur if the seal is broken. This combination would further allow for the real time monitoring while fluids are being injected and/or sampled to and from the formation.

However, to provide accurate formation evaluation measurements, it may be necessary to permit relative movement of the NMR sensor relative to the wellbore wall. In the example shown in FIG. 7, the NMR sensor 446 is rotatively decoupled from the rest of the tool 400 using swivels 430a and 430b. In addition, a motor 445 may be used for rotating or the NMR sensor 446 between a plurality of orientations in the wellbore, as described for example in the process of FIG. 4. Additionally, the motor 445 may be used for orienting the angular sector in which the NMR sensor 446 has a larger sensitivity relative to a spot where the injection has been successful. In addition, one or more of the inclination and orientation of the sensor 446 may be measured by counting or monitoring motor turns.

Additionally, the rotatable sensor assembly may include an abrasive component (such as a PDC insert) which may be used to ream or scrape away mudcake and a thin layer of damaged permeability formation in order to establish injectivity of fluid into the formation.

Figure 10:
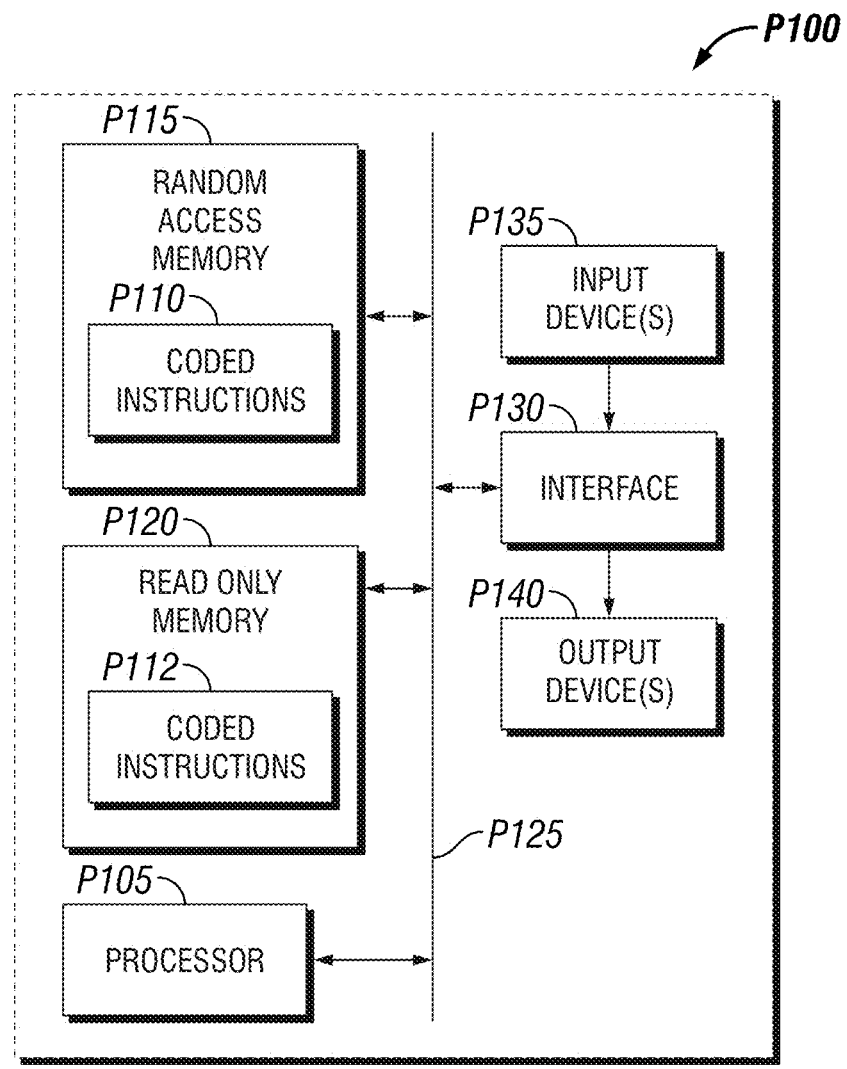
FIG. 10 is a schematic illustration of an example processor platform that may be used and/or programmed to implement any of all of the example methods and apparatus described herein.

As with the example system shown in FIG. 6, the example method for selecting a particular spot where the injection has been successful from a plurality of measurements described herein in FIG. 4 may be implemented by controlling the operations of the wireline tool 400, by one or both of the downhole control system 412 and the electrical control and data acquisition system 406, as further described in FIG. 10.

Figure 8:
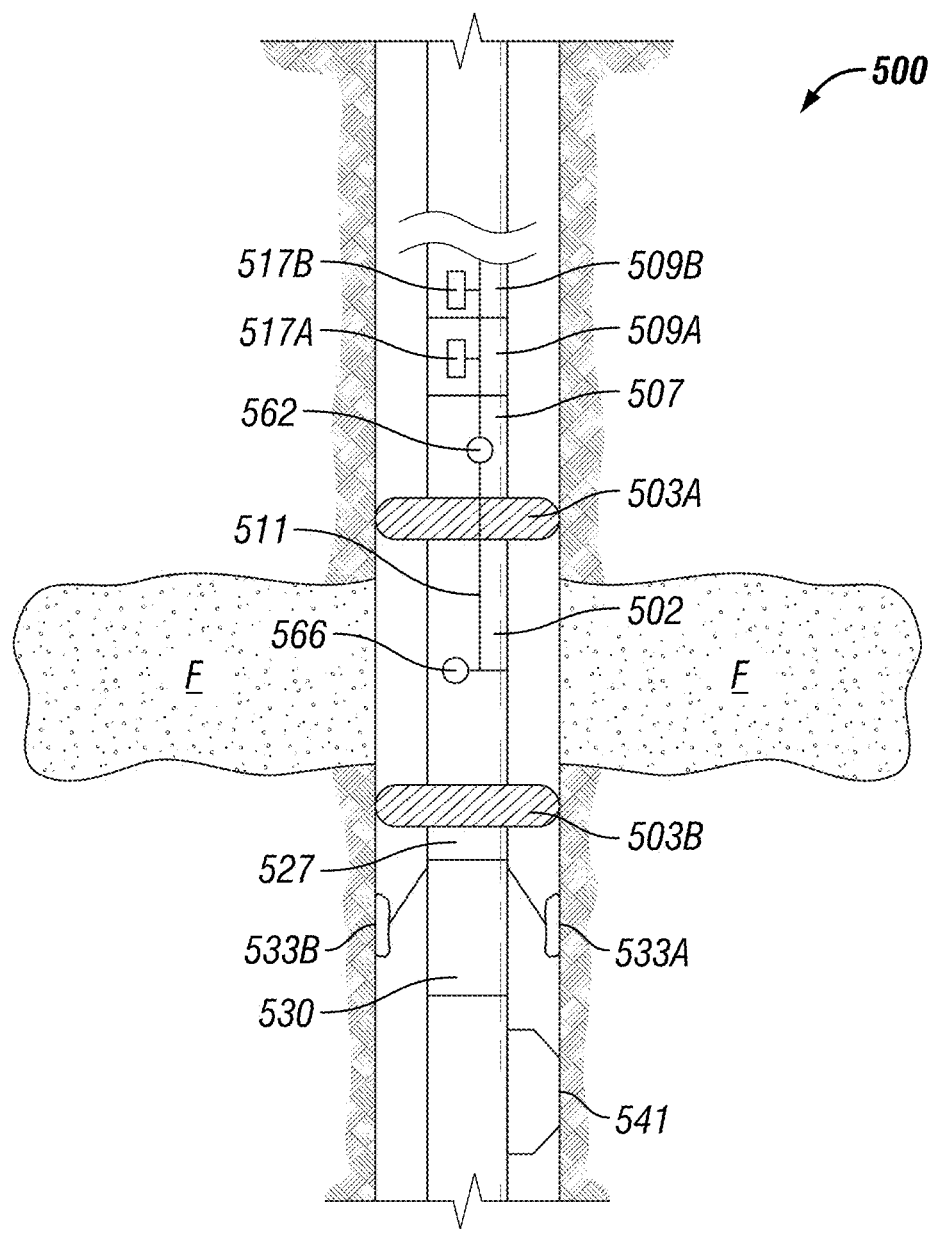
FIG. 8 shows a block diagram of yet another example apparatus that is provided with an imaging means for selecting a particular spot where the injection has been successful.

FIG. 8 shows a block diagram of an example downhole tool 500 that is provided with an imaging means for selecting a particular spot where the injection has been successful. In particular, the example downhole tool 500 may be used to implement for example the method described in FIG. 5A. The downhole tool 500 may be conveyed on drill pipe or tubing which allows dynamic control of the tool orientation and depth and supports larger tool weight.

To inject fluid into the formation F, the downhole tool 500 is provided with a formation tester tool comprising a power cartridge (not shown) that provides power and telemetry to the downhole tool 500, as well as a downhole processing platform, a dual or straddle packer module 502 having packers 503a and 503b, a pump module 507 having a pump 562, and sample chambers 517a and 517b housed in modules 509a and 509b respectively. The sample chambers may be filled with injection fluids as discussed therein prior to lowering the tool into the wellbore, or may alternatively be filled with formation fluids collected for example at the bottom or the top of the reservoir. Also, downhole fluids may be doped with additives conveyed downhole into the sample chambers 517a or 517b. The pump 562, the sample chambers 517a or 517b, and a pressure sensor 566 and fluid analysis and sensors (not shown) such as density, viscosity, resistivity, optical spectrometers, bubble point, etc. . . . , are disposed along a flow line 511 running through several modules of the downhole tool 500.

To provide inclinometry measurements, the downhole tool 500 is provided with a General Purpose Inclinometry Tool 527 (GPIT, a trademark of Schlumberger Technology Corporation), or any device having similar functionality. Specifically, an orientation is defined by tool deviation, tool azimuth, and relative bearing. The GPIT tool 527 uses both a three-axis inclinometer and a three-axis magnetometer to make measurements for determining these parameters. The GPIT 527 may be used for measuring the absolute orientation of the measurements performed by the downhole tool 500.

To determine where injection has been successful within the interval sealed by the packers 503a and 503b, the apparatus 500 is provided with an FMI 530 and/or any other device having similar functionality. Specifically, the FMI 530 that may provide an electrical borehole image generated from up to 192 microresistivity measurements affixed on a plurality of articulated pads 533a, 533b, . . . disposed around the housing of the FMI 530. Special focusing circuitry ensures that the measuring currents are forced into the formation, where they modulate in amplitude with the formation conductivities to produce low-frequency signals rich in petrophysical and lithological information and a high-resolution component that provides the microscale information used for imaging and dip interpretation. Alternatively, other types of imaging tools, such as dielectric imagers or an Oil-Base MicroImager (OBMI, a trademark of Schlumberger Technology Corporation) may be used.

Optionally, an NMR 541 capable of making simultaneous multifrequency measurements, for investigating the formation at multiple depths in a single pass and/or for providing information about permeability, fluid identification and fluid contacts may be provided. The NMR tool 541 is preferably implemented with an eccentered configuration, which may be useful because its response has an azimuthal sensitivity and does not average the reading over the entire wellbore circumference.

The FMI tool 530 may be used in combination with the optional NMR sensor 541 to determining exactly where the fluid was injected in the dual packer interval and to orient the angular sector in which NMR sensor 541 has a larger sensitivity towards the zone where the fluid was successfully injected. Alternatively, the FMI tool 530 may be used to implement the process described in FIG. 4 or 5B, in particular, if the injection fluid resistivity contrasts with the connate water resistivity.

Figure 9:
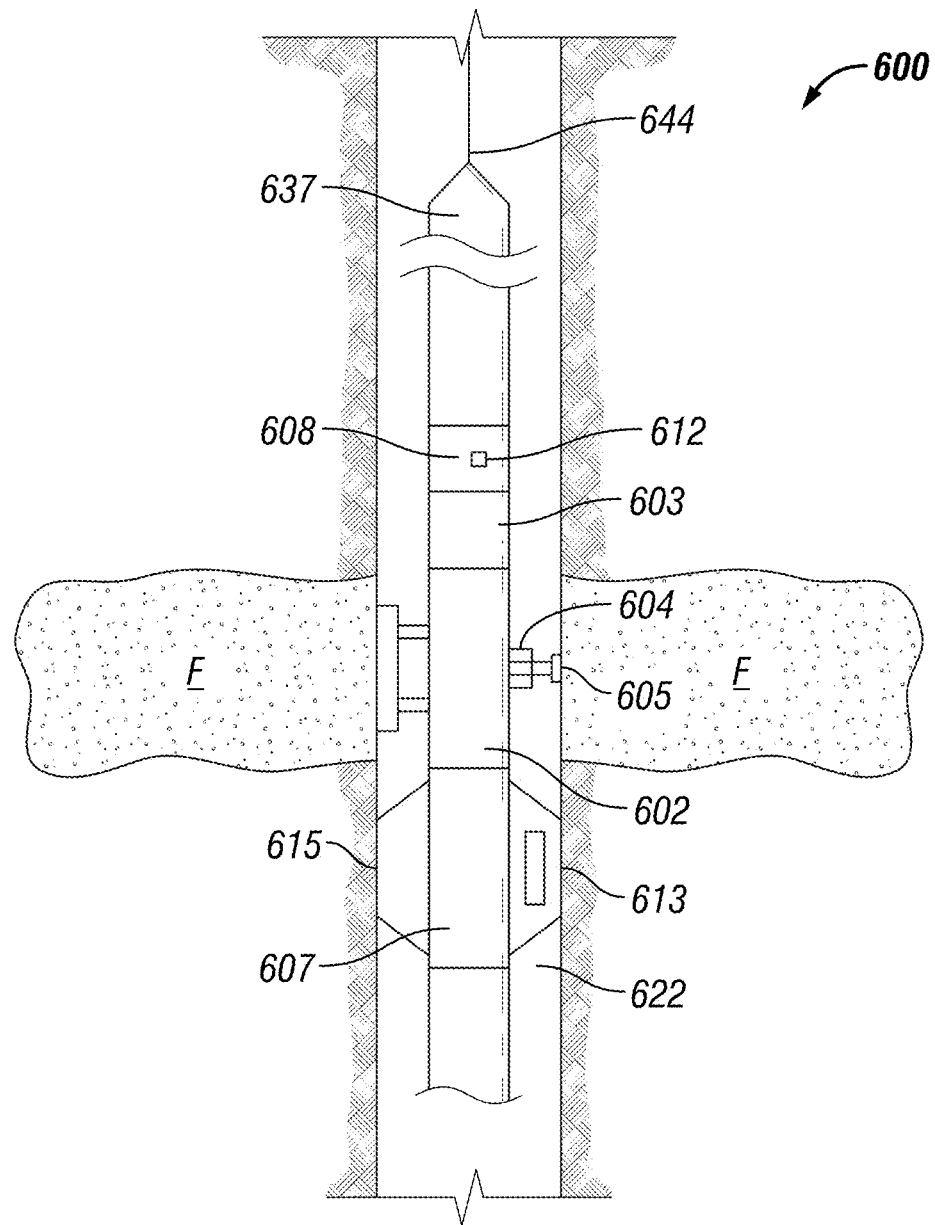
FIG. 9 shows a block diagram of still another example apparatus that is provided with means for steering an NMR sensor along a particular azimuth.

While the apparatuses described in FIGS. 6, 7, and 8 show embodiments that utilize a dual or straddle packer, a second approach depicted in FIG. 9 combines a formation evaluation sensor and a formation tester tool having a probe assembly. This combination has the advantage that flow to the reservoir is localized in a very small probe area and therefore flow characteristics are better determined. Sweep efficiency of formation fluids by injected fluids (or of invaded/injected fluids by formation fluids when sampling) would also be better because the flow velocity of injected/sampled fluids close to the probe is much higher. This may in turn yield a more accurate residual oil saturation (or Irreducible Water Saturation SWIR).

Turning to FIG. 9, a block diagram of an example downhole tool 600 that is provided with means for steering an NMR sensor along a particular azimuth is shown. In particular, the example downhole tool 600 may be used to implement for example the methods described in FIG. 5B. As shown, the downhole tool 600 is conveyed in a wellbore drilled through an underground formation via wireline cable 644.

To provide inclinometry measurements, the downhole tool 600 is provided with a General Purpose Inclinometry Tool 603, similar to the General Purpose Inclinometry Tool 527 of FIG. 8. To provide electrical power, telemetry with a surface unit, and downhole processing, the downhole tool 600 includes a telemetry module 608. In addition, the telemetry module 608 preferably includes a natural gamma ray sensor 612. The natural gamma ray sensor may be used to generate an image of the formation. This image may in turn be used to derive a correlation between axial positions of the downhole tool and geological features of the formation that have been identified in the image generated but the gamma ray sensor. The derived correlation may consequently be used to precisely position or reposition the downhole 600 in the wellbore.

To inject fluid into the formation F, the downhole tool 600 is provided with a formation tester tool comprising a pump module 602 having an extendable probe assembly 604 for sealing off a portion of the wellbore wall, and sample chambers (not shown) for conveying injection fluid downhole. Preferably, the probe assembly is provided with a drilling or coring tool 605 protruding from the sealed off a portion of the wellbore wall for perforating an impermeable mudcake that may eventually isolate the wellbore from the formation. Fluid injection into the formation F may require the use of a low speed pump to ensure a sufficiently low injection flowrate and/or a sufficient low injection pressure to avoid losing the seal provided by the probe assembly 604.

To perform measurement on the formation F, before and/or after injection, and in particular to derive residual oil saturation, the downhole tool 600 is provided with an NMR tool 607 and having an NMR sensor 613 similar to the NMR sensor of the NMR tool 541 of FIG. 8. The NMR sensor 613 is disposed in a pad 622 that is applied against the formation by a bow spring 615. In the embodiment of FIG. 9, the NMR pad 622 and the bow spring 615 may be used to steer the downhole tool 600 along a particular azimuth, maintaining thereby the angular position agreement of the NMR sensor 613 with the probe assembly 604. In addition, reducing the amount of torque transmitted from the cable 644 to the downhole tool string 600 with a swivel 637 also facilitates maintaining the angular position agreement of the NMR sensor 613 with the probe assembly 604. Finally, an operator at the surface may check that the angular position agreement has been maintained during moving the tool string 600 by monitoring, for example, the orientation of the tool string determined by the magnetometers provided by the GPIT 603.

FIG. 10 is a schematic diagram of an example processor platform P100 that may be used and/or programmed to implement all or a portion of any or all of the example operations of FIGS. 3, 4, 5A, and 5B. For example, the processor platform P100 can be implemented by one or more general purpose processors, processor cores, microcontrollers, etc. The example processor platform P100, or a platform similar thereto, may be used to implement the logging and control system 360, the electrical control and data acquisition system 406, and/or the processing system 412 described above.

The processor platform P100 of the example of FIG. 10 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor, and/or a microcontroller. The processor P105 may execute, among other things, one or more of the example processes of FIG. 3, 4, 5A or 5B and/or may otherwise be employed to implement one or more aspects of the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

Those skilled in the art should recognize that the present disclosure thus introduces a system for formation evaluation comprising means for conveying a tool string in a wellbore penetrating a formation, a testing tool attached to the tool string conveying means and configured to inject a fluid into the formation, and an NMR tool having an eccentered configuration having a sensitivity in a particular angular sector and thus not all around the wellbore. The tool string conveying means may include means for rotating the tool string relative to the formation.

The present disclosure also introduces a method of evaluating a formation comprising injecting a fluid at an injection point in a formation using a tool positioned in a wellbore penetrating the formation, wherein the tool has a dual packer configuration. A nuclear magnetic resonance (NMR) tool is then oriented relative to the formation, and an NMR measurement is performed using the NMR tool. A residual concentration of the fluid after injection is then determined based on the NMR measurement. The method may further comprise expanding at least one packer of the dual packer configuration. The method may further comprise measuring an annular pressure existing between the tool and a wall of the wellbore. The method may further comprise pumping fluid from the formation to breach mudcake formed on a wall of the wellbore. The method may further comprise measuring a pressure of the formation proximate the tool. The method may further comprise imaging the formation proximate the injection point. The imaging may be performed above and/or below the injection point. The method may further comprise using an image resulting from the imaging to select a particular spot where injection has been successful. The method may further comprise determining a residual oil concentration from the measurement at the spot.

The present disclosure also introduces a method of evaluating a formation comprising lowering a downhole tool in a wellbore penetrating the formation, injecting a fluid into the formation at an injection zone via the downhole tool, and using a formation evaluation sensor to perform a measurement at each of a plurality of locations in the wellbore each proximate the injection zone. At least two of the plurality of measurements are compared, and a formation property is then determined based on the comparison. Injecting the fluid into the formation at the injection zone may comprise at least one of: inflating packers respectively above and below the injection zone; and extending a probe in or near the injection zone. The method may further comprise pumping fluid from the formation via the downhole tool prior to injecting fluid into the formation. The method may further comprise measuring pressure data and determining whether a mudcake formed on the wellbore has been breached based on the measured pressure data. Using the formation evaluation sensor to perform a measurement at each of a plurality of locations may include orienting the formation evaluation sensor at each of a plurality of corresponding locations. Orienting the formation evaluation sensor at each of the plurality of corresponding locations may include rotating a tubing employed to convey the formation evaluation sensor in the wellbore. The method may further comprise measuring at least one of: a downhole tool deviation component with respect to the Earth's gravitational field; and a downhole tool azimuth component with respect to the Earth's magnetic field. Orienting the formation evaluation sensor may comprise orienting the formation evaluation sensor based on one or more of the measured downhole tool deviation component and the measured downhole tool azimuth component. The plurality of locations in the wellbore each proximate the injection zone may include at least one location above the injection zone and at least one location below the injection zone. The formation evaluation sensor may be one of a plurality of formation evaluation sensors disposed around a housing of the downhole tool. The method may further comprise selecting a particular spot where the injection has been successful based on the comparison of the plurality of measurements. Determining the formation property may comprise determining a residual oil saturation from the measurement at the particular spot where the injection has been successful. The formation evaluation sensor may be selected from the group consisting of an NMR sensor, a gamma ray sensor, an electric permittivity sensor, and a micro-resistivity sensor. The injected fluid may comprise at least one of water doped with manganese chloride, water doped with a radioactive tracer, and saline water. The injection fluid may comprise one or more of a surfactant, a solvent, a stimulant, carbon dioxide, and a hydrocarbon, and may be configured to change at least one of a hydrocarbon mobility, a wetting phase, and a residual oil saturation of the formation.

The present disclosure also introduces a method of evaluating a formation comprising positioning a downhole tool in a wellbore penetrating a formation, wherein the downhole tool includes a formation evaluation sensor having a larger sensitivity in an angular sector, and wherein positioning the downhole tool in the wellbore includes positioning the formation evaluation sensor proximate the injection zone. A fluid is injected in the formation at an injection zone via the downhole tool. The method also includes orienting the angular sector in which the formation evaluation sensor has a larger sensitivity relative to the injection zone, performing at least one measurement using the sensor in the oriented position, and determining a formation property based on the measurement. The method may further comprise imaging a portion of the wellbore wall and selecting a particular spot where the injection has been successful based on the image. Orienting the angular sector in which the formation evaluation sensor has a larger sensitivity relative to the injection zone may be based on the selected spot. Imaging a portion of the wellbore wall may comprise providing a plurality of micro-resistivity measurements. Orienting the angular sector in which the formation evaluation sensor has a larger sensitivity relative to the injection zone may comprise steering the formation evaluation sensor along a particular azimuth. Orienting the angular sector in which the formation evaluation sensor has a larger sensitivity relative to the injection zone may comprise actuating a motor operatively coupled with the formation evaluation sensor. The formation property may comprise a residual oil saturation. The formation evaluation sensor may be an NMR sensor having a larger sensitivity in an angular sector.

The present disclosure also introduces a method of evaluating a formation comprising positioning a downhole tool in a wellbore penetrating a formation, wherein the downhole tool includes a formation evaluation sensor. A fluid is injected in the formation via the downhole tool at an injection zone. A measurement is performed at a plurality of locations in the wellbore using the formation evaluation sensor. At least one injection spot where the injection has been successful is determined based on the plurality of measurements. A formation property representative of the injection spot is then determined. Determining at least one injection spot where the injection has been successful based on the plurality of measurements may comprise determining an injection saturation image based on the plurality of measurements. Determining at least one injection spot where the injection has been successful may comprise comparing at least two saturation values from the saturation image. Performing a measurement at the plurality of locations in the wellbore using the formation evaluation sensor may include rotating a tubing configured to convey the downhole tool in the wellbore. The formation evaluation sensor may be an NMR sensor having a larger sensitivity in an angular sector. The formation property may comprise a residual oil saturation. The formation property may comprise at least one of irreducible water saturation, wettability, and relative permeability.

More generally, the present disclosure introduces a combination of tools and technology for performing formation log measurements immediately before and after flow perturbation. One goal is to alter formation properties through the controlled injection of custom fluids. The changes in formation log responses effected by the injection may reveal information critical to reservoir management and exploitation, possibly including and utile for dynamic petrophysical properties, incremental oil recovery effected through EOR floods, and formation response to the entry of EOR fluids, among other information/uses within the scope of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of evaluating a formation, comprising:
    injecting a fluid in a subterranean formation using a tool positioned in a wellbore penetrating the formation, wherein the tool comprises a formation evaluation sensor;
    determining a spot where injection has been successful by moving the formation evaluation sensor to a plurality of locations along the wellbore to perform measurements;
    performing at least one measurement at each location along the wellbore for determination of successful injection, wherein a successful injection is determined by identifying a position where a oil saturation value is lowest;
    orienting the formation evaluation sensor relative to the formation at the spot where injection has been successful;
    performing a measurement using the formation evaluation sensor in the oriented position at the successful injection spot; and
    determining a formation property based on the measurement at the successful injection spot.

2. The method of claim 1, wherein determining the formation property comprises determining at least one of a residual oil concentration and a residual oil saturation.

3. The method of claim 1, wherein injecting comprises injecting the fluid at an injection point in the formation, wherein the tool further comprises a dual packer configuration, wherein the formation evaluation sensor comprises a nuclear magnetic resonance (NMR) sensor, and wherein the formation property is a residual concentration of the injected fluid after injection.

4. The method of claim 3, further comprising expanding at least one packer of the dual packer configuration.

5. The method of claim 3, further comprising measuring at least one of:
    an annular pressure existing between the tool and a wall of the wellbore; and
    a pressure of the formation proximate the tool.

6. The method of claim 3, further comprising pumping fluid from the formation to breach mudcake formed on a wall of the wellbore.

7. The method of claim 3, further comprising:
    imaging the formation proximate the injection point, wherein imaging comprises at least one of:
        imaging the formation above the injection point; and
        imaging the formation below the injection point; and
    using an image resulting from the imaging to select a particular spot where injection has been successful.

8. The method of claim 1, wherein the formation evaluation sensor has a larger sensitivity in an angular sector, and wherein orienting the formation evaluation sensor comprises orienting the angular sector relative to an injection zone in the formation in which the fluid is injected.

9. The method of claim 8, further comprising imaging a portion of the wellbore wall and selecting a particular spot where the injection has been successful based on the image.

10. The method of claim 9, wherein orienting the angular sector is based on the selected spot.

11. The method of claim 9, wherein imaging a portion of the wellbore wall utilizes a plurality of micro-resistivity measurements.

12. The method of claim 8, wherein orienting the angular sector comprises steering the formation evaluation sensor along a particular azimuth.

13. The method of claim 8, wherein orienting the angular sector comprises actuating a motor operatively coupled with the formation evaluation sensor.

14. A method of evaluating a formation, comprising:
    injecting a fluid in a formation via a downhole tool at an injection zone in a wellbore penetrating the formation, wherein the downhole tool includes a formation evaluation sensor;
    determining a spot where injection has been successful by moving the formation evaluation sensor to a plurality of locations along the wellbore to perform measurements;

performing at least one measurement at each location along the wellbore for determination of successful injection, wherein a successful injection is determined by identifying a position where a oil saturation value is lowest using the formation evaluation sensor to perform a measurement at each of a plurality of locations in the wellbore each proximate the injection zone; and determining a formation property based on at least one of:
 a comparison of at least two of the plurality of measurements; and
 a determination of at least one injection spot where the injection has been successful based on the plurality of measurements.

15. The method of claim 14, wherein using the formation evaluation sensor to perform the measurements comprises rotating a tubing employed to convey the downhole tool in the wellbore.

16. The method of claim 14, wherein the formation property comprises at least one of:
 residual oil saturation;
 irreducible water saturation;
 wettability; and
 relative permeability.

17. The method of claim 14, wherein injecting the fluid comprises at least one of:
 inflating packers respectively above and below the injection zone; and
 extending a probe in or near the injection zone.

18. The method of claim 14, further comprising:
 pumping fluid from the formation via the downhole tool prior to injecting fluid into the formation;
 measuring pressure data; and
 determining whether a mudcake formed on the wellbore has been breached based on the measured pressure data.

19. The method of claim 14, further comprising:
 measuring at least one of:
  a downhole tool deviation component with respect to the Earth's gravitational field; and
  a downhole tool azimuth component with respect to the Earth's magnetic field; and
 orienting the formation evaluation sensor based on the at least one of the measured downhole tool deviation component and the measured downhole tool azimuth component.

20. The method of claim 14, wherein the plurality of locations comprise at least one location above the injection zone and at least one location below the injection zone.

21. The method of claim 14, wherein the formation evaluation sensor is selected from the group consisting of an NMR sensor, a gamma ray sensor, an electric permittivity sensor, and a micro-resistivity sensor.

* * * * *